United States Patent [19]

Kosaka

[11] Patent Number: 5,742,824
[45] Date of Patent: Apr. 21, 1998

[54] PROGRAM CONTROL SYSTEM IN MULTITASK ENVIRONMENT

[75] Inventor: Tetsuya Kosaka, Yamanashi, Japan

[73] Assignee: Fanuc Ltd., Yamanashi, Japan

[21] Appl. No.: 720,917

[22] Filed: Oct. 7, 1996

Related U.S. Application Data

[63] Continuation of Ser. No. 330,818, Oct. 24, 1994, abandoned.

[30] Foreign Application Priority Data

Nov. 8, 1993 [JP] Japan .................. 5-277985

[51] Int. Cl.⁶ ................................................ G06F 9/40
[52] U.S. Cl. ...................... 395/676; 395/80; 395/677; 395/672
[58] Field of Search ................... 395/676, 80, 677, 395/672

[56] References Cited

U.S. PATENT DOCUMENTS

| | | | |
|---|---|---|---|
| 4,633,385 | 12/1986 | Murata | 364/191 |
| 4,800,482 | 1/1989 | Hosaka | 364/140 |
| 4,995,148 | 2/1991 | Bonomi . | |
| 5,032,975 | 7/1991 | Yamamoto | 364/134 |
| 5,044,064 | 9/1991 | Muselli | 3/155 |
| 5,266,878 | 11/1993 | Makino | 318/517 |

Primary Examiner—Lucien U. Toplu
Attorney, Agent, or Firm—Staas & Halsey

[57] ABSTRACT

A program control system in a multitask environment to execute a plurality of programs in parallel. The system includes a program execution control device for controlling an execution of a plurality of programs, a first program and a second program which are mutually related, a subtask execution recognition device for recognizing a subtask execution command in the first program, and a resumption control device for resuming the first program in response to both a wait command in the first program and an end command in the second program of the task associated with the task of the first program. When the subtask execution command is recognized by the subtask execution recognition device while the first program is being executed, the second program is also executed. When the end command in the second program is detected while the first program is in a wait state under the wait command, the resumption control means allows the program execution control means to resume the first program.

2 Claims, 4 Drawing Sheets

FIG. 4 (A)

```
┌─── PROGRAM A ───────────────────┐
│                                  │
│  1: RUN B                        │
│                                  │
│  2: J P[1] 50% FINE              │
│                                  │
│  3: WAIT SDO [1] = ON            │
│                                  │
│  4: L P[2] 150 MM/SEC CNT100 SS[1]│
│           ⋮                      │
│                                  │
│ 20: SE                           │
└──────────────────────────────────┘
```

FIG. 4 (B)

```
┌─── PROGRAM B ──────────┐
│  1: RUN C               │
│  2: J P[1] 100% FINE    │
│  3: WAIT SDO [2] = ON   │
│  4: PICK WORKPIECE      │
│  5: J P[2] 20% FINE     │
│  6: SET WORKPIECE       │
│  7: SDO[1] = ON         │
└─────────────────────────┘
```

FIG. 4 (C)

```
┌─── Program C ──────────┐
│  1: MOVE WORKPIECE      │
│  2: SDO [2] = ON        │
└─────────────────────────┘
```

PROGRAM CONTROL SYSTEM IN MULTITASK ENVIRONMENT

This application is a continuation of application Ser. No. 08/330,818, filed Oct. 24, 1994, now abandoned.

BACKGROUND OF THE INVENTION

(1) Field of the Invention

The present invention relates to a program control system in a multitask environment, and more particularly, to a program control system in a multitask environment which can be applied to a control unit for a numerically controlled machine tool, an industrial robot, or the like to facilitate execution, halt, recommencement, and termination of a program.

(2) Description of the Related Art

Conventionally, a control unit for a numerically controlled tool machine, an industrial robot, or the like often executes only one program in normal, and therefore the peripheral devices thereof are configured so as to be operated by a single task. The term "program" herein used means a program which has been prepared by a user and generally called a user program, operation program, work program, teaching program or the like. Such a program, will be simply called as a program hereinafter.

Recently, a multitasking operation to simultaneously run a plurality of programs has become popular in the field of numerical control units or industrial robots. Taking a case of a certain manufacturing line for machining workpieces, if there is used a system comprising an apparatus for picking out a workpiece from a warehouse, a machine for transferring the picked out workpiece to a working table, and a machine tool for machining the transferred workpiece, for example, three programs, each of which performs the respective corresponding function, are executed simultaneously. These three programs run in parallel synchronizing with a digital input signal, each of the programs, however, essentially runs as an completely separate program.

In the case mentioned above, in order to execute, halt, recommence, or terminate individual programs, it is necessary to either individually or simultaneously select the programs to be controlled for a start or end of the programs. For example, if the first and the second programs are in the halt state, in order to recommence execution of the programs from this state, first, the first program is selected by some way, concretely, for example, by moving a cursor using a teaching console or by using a signal inputted from an external device, then recommenced. Next, the second program is selected likewise to be executed. Or, all programs in halt are recommenced at a time.

In a conventional program control system, a plurality of programs are individually selected and then controlled, even though in a multitask environment where the plurality of programs can be executed in parallel. That is, the conventional system takes a form such that a program control system in a single task environment where only one program is executed at a time is simply extended.

To execute programs in the multitask environment, the above mentioned procedure such as controlling programs after individually selecting can be time-consuming and problematic, and tends to cause an operational error. In addition, the conventional system is not well matched to a current automated system in which input/output of a digital signal from an external device is used to execute, halt, recommence, or terminate execution of a program. That is, the system configuration for controlling the programs by a digital signal from the external device is designed for use with the single tasking operation, and is therefore, usually not well adopted to the multitask operation as it is.

A further disadvantage of the above mentioned procedure for starting and terminating all the programs is that this procedure lacks for flexibility and a system cannot be configured freely though in the multitask environment where a flexible system can be organized. For example, when execution of a program is recommenced from the halt state, even though there is a robot which has already finished its work in a series of works such as in a manufacturing line and which is therefore not necessary to be recommenced, all the program must be recommenced at a time and can not be executed individually and selectively.

SUMMARY OF THE INVENTION

The invention aims to remedy these disadvantages and to provide a program control system in a multitask environment where a plurality of programs can be executed in parallel, wherein a program which is related to and associated with a certain program is allowed to be executed automatically by executing the program.

To solve the above mentioned problems, a program control system in a multitask environment is provided wherein operational programs respective for machine tools or industrial robots are allowed to be executed in parallel in an environment where a plurality of programs can be executed, comprising a program execution control means for controlling execution of a plurality of programs, a first program which is activated as an originating task by the program execution control means, a subtask execution recognition means for recognizing an execution command of a subtask in the first program, a second program which is activated as a subtask by the program execution control means in response to the recognition of execution of the subtask by the subtask execution recognition means, and a resumption control means for resuming the first program by the program execution control means in response to both a wait command in the first program indicating the first program to be in a wait state and an end command in the second program indicating that the task in the second program associated with the task in the first program is finished.

According to the system mentioned above, the first program selected from among relevant programs is executed as an originating task by the program execution control means. Then, if a subtask execution command of the first program, which specifies execution of a subtask, is reached, the subtask execution recognition means recognizes the command and the program execution control means begins execution of the second program, during which the first program is executed continuously. If a wait command of the first program is directed, under which the first program can not be resumed until an end of the second program, this is notified to the resumption control means. Then, when completion of the second program is notified to the resumption control means, the program execution control means resumes execution of the first program which has been in the wait state.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4(A) is a diagram showing one example of a program of a robot control unit;

FIG. 4(B) is a diagram showing another example of a program of a robot control unit; and FIG. 4(C) is a diagram showing a further example of a program of a robot control unit.

DESCRIPTION OF THE PREFERRED EMBODIMENTS

A preferred embodiment of the present invention will now be described hereinafter with reference to the drawings.

Figure 1:
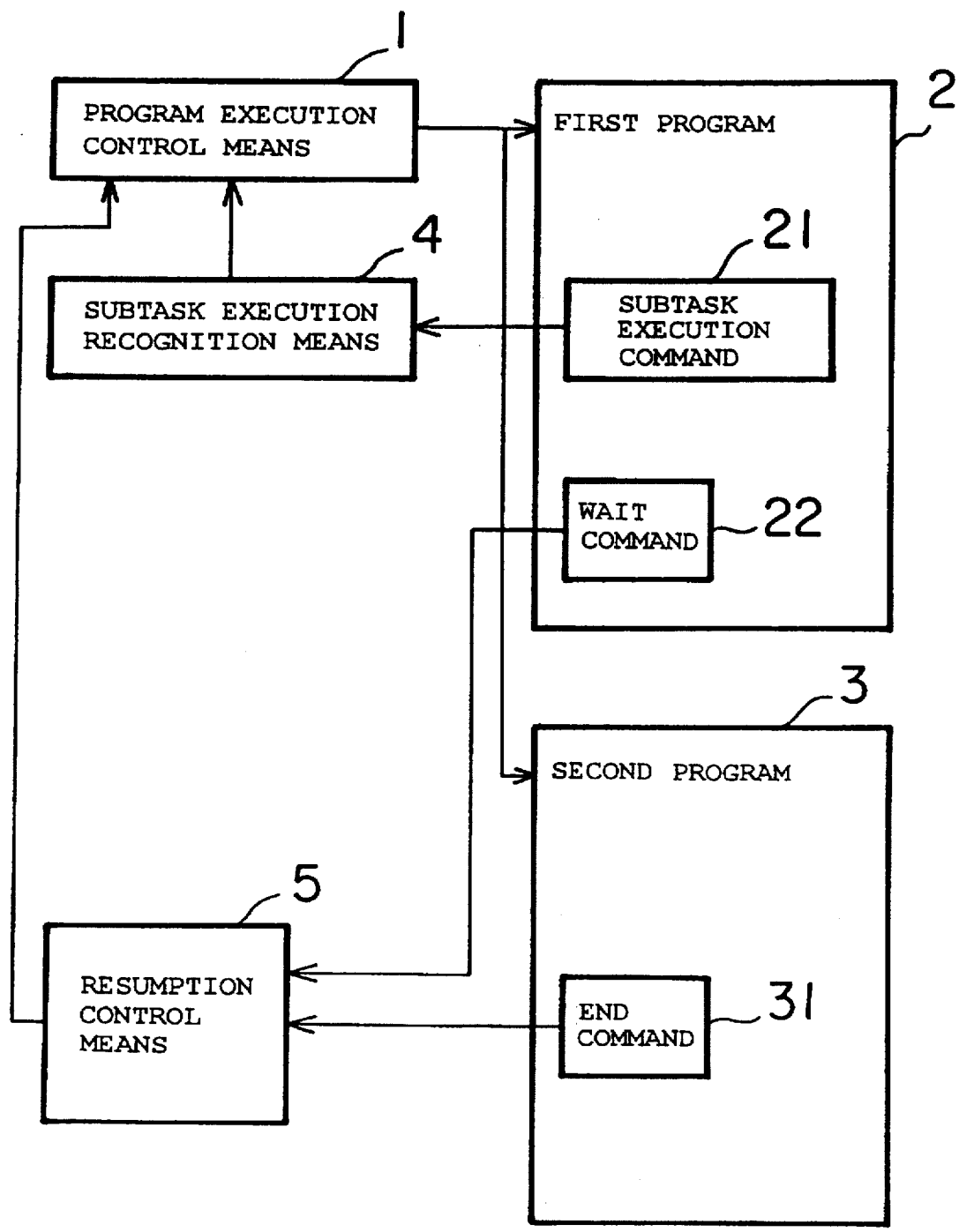
FIG. 1 is a block diagram illustrating a configuration of a program control system in accordance with the present invention.

FIG. 1 is a block diagram illustrating a configuration of a program control system in accordance with the present invention. Referring to FIG. 1, the reference numeral 1 designates a program execution control means which is adapted to control execution of a first program 2 and a second program 3. The first program 2 contains a subtask execution command 21 and a wait command 22. The subtask execution command 21 is adapted to be recognized by a subtask execution recognition means 4 and the wait command 22 is adapted to be detected by a resumption control means 5. The second program 3 contains an end command 31 and the resumption control means 5 is adapted to comply with the end command 31. Outputs of the subtask execution recognition means 4 and the resumption control means 5 are connected to an input to control the program execution control means 1.

In order to activate the programs, it is necessary to activate the first program 2 and the second program 3 for multitasking. In actual activation operation, however, both the first and the second programs can be activated only by selecting and activating the first program 2, which is the same way as with a single tasking. The first program 2 selected in this way is activated as an originating task by the program execution control means 1.

When the subtask execution command 21 of the first program 2 is reached while the first program 2 is executed, the command 21 is recognized by the subtask execution recognition means 4 and notified to the program execution control means 1. In response to the notification, the program execution control means 1 activates the second program 3 as a subprogram of the first program 2, during which the execution of the first program 2 is continued.

When the wait command 22 under which the first program is not resumed until an end of execution of the second program is directed, this is notified to the resumption control means 5. When the second program 3 is executed to the end, the end command 31 of the second program 3 is transferred to the resumption control means 5. In response to the wait command 22 of the first program 2 and the end command 31 of the second program 3, the resumption control means 5 controls the program execution control means 1 to resume the first program 2 from the wait state.

When the first program 2 is in activation and the subtask execution command 21 of the first program 2 is reached as mentioned above, the first program 2 becomes a parent program of the second program 3 and the second program 3 becomes a child program of the first program 2, thereby a set membership is automatically provided. Accordingly, only by indicating halt, resumption, and termination of execution to the first program 2 which is a parent program, the indication is transferred to the second program 3 to which a set membership is held with the first program, and automatically reflected to the second program 3.

Similarly, if the other subtask execution command to execute a third program is contained in the first program 2 or the second program 3 and is directed, a new set membership is provided therebetween and the third program is executed by the subtask execution recognition means 4 and the program execution control means 1. Thus, the third program stands to the first program 2 in the relation of grandchild, and if execution of the third program is activated, for example, from the second program 3, then the operation to the parent program is applied and reflected to the grandchild program.

Therefore, if the programs held in a set membership relation are grouped, in a certain system, the whole group is activated by selecting and activating only the parent of the group.

On the other hand, when the programs are controlled from an external device, finally, what is necessary is to control the parent program only, and therefore such a system can be used in an environment prepared for the single tasking operation as it is.

Figure 2:
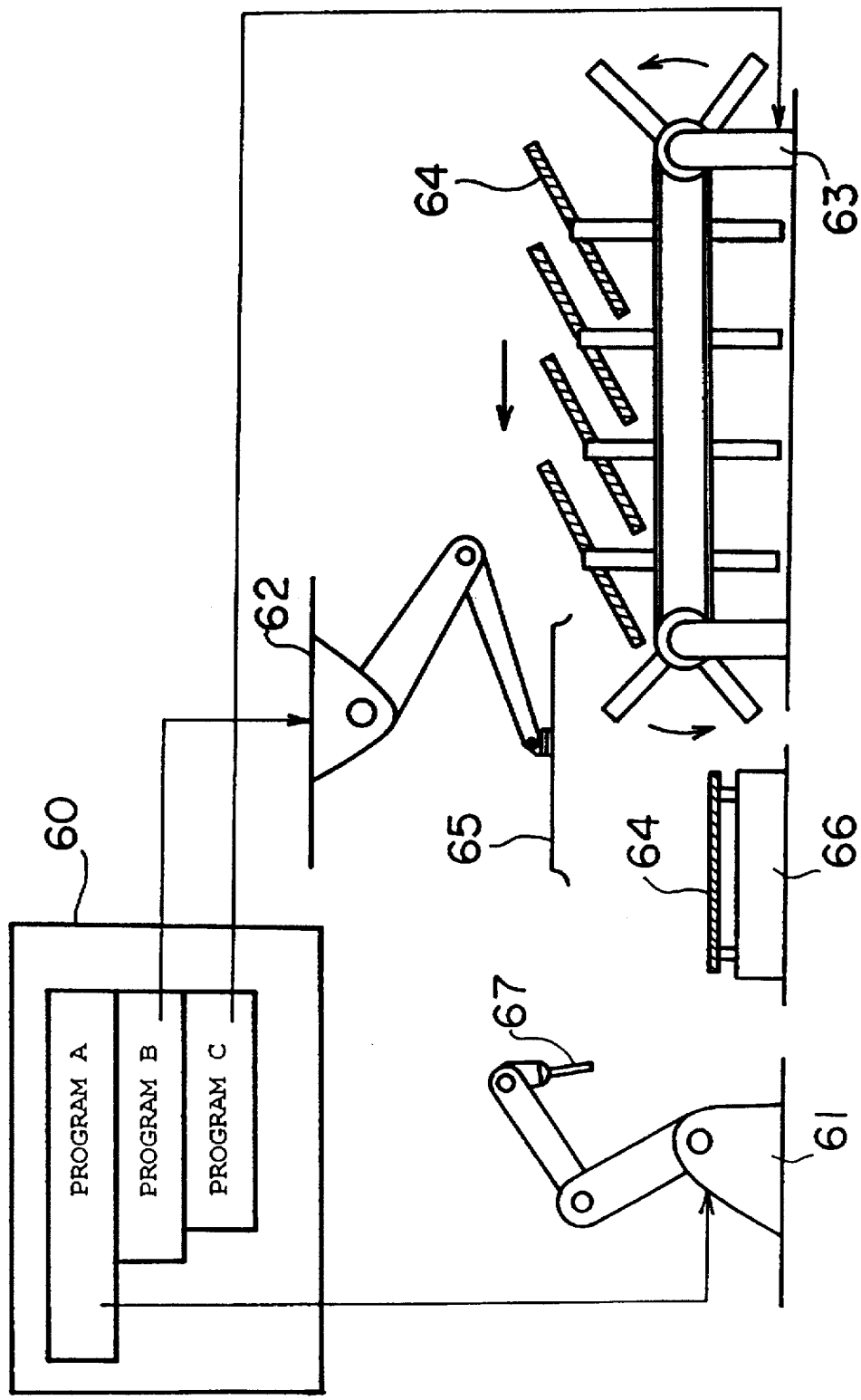
FIG. 2 is a diagram of a robot system for illustrating an application example of the present invention.

FIG. 2 is a diagram of a robot system for illustrating an application example of the present invention. Referring to FIG. 2, a robot control unit 60 is adapted to control a sealing robot 61, a workpiece loader 62, and a workpiece supply machine 63 and provided with a program A for controlling the sealing robot 61, a program B for controlling the workpiece loader 62, and a program C for controlling the workpiece supply machine 63.

Workpieces 64 are sequentially supplied by the workpiece supply machine 63 and moved to the position where the workpiece loader 62 picks up the workpiece 64 with the hand for loading. The workpiece 64 moved to the position mentioned above is set in position on a jig 66 by the workpiece loader 62. Then the sealing robot 61 performs a predetermined sealing operation using its sealing gun.

Figure 3:
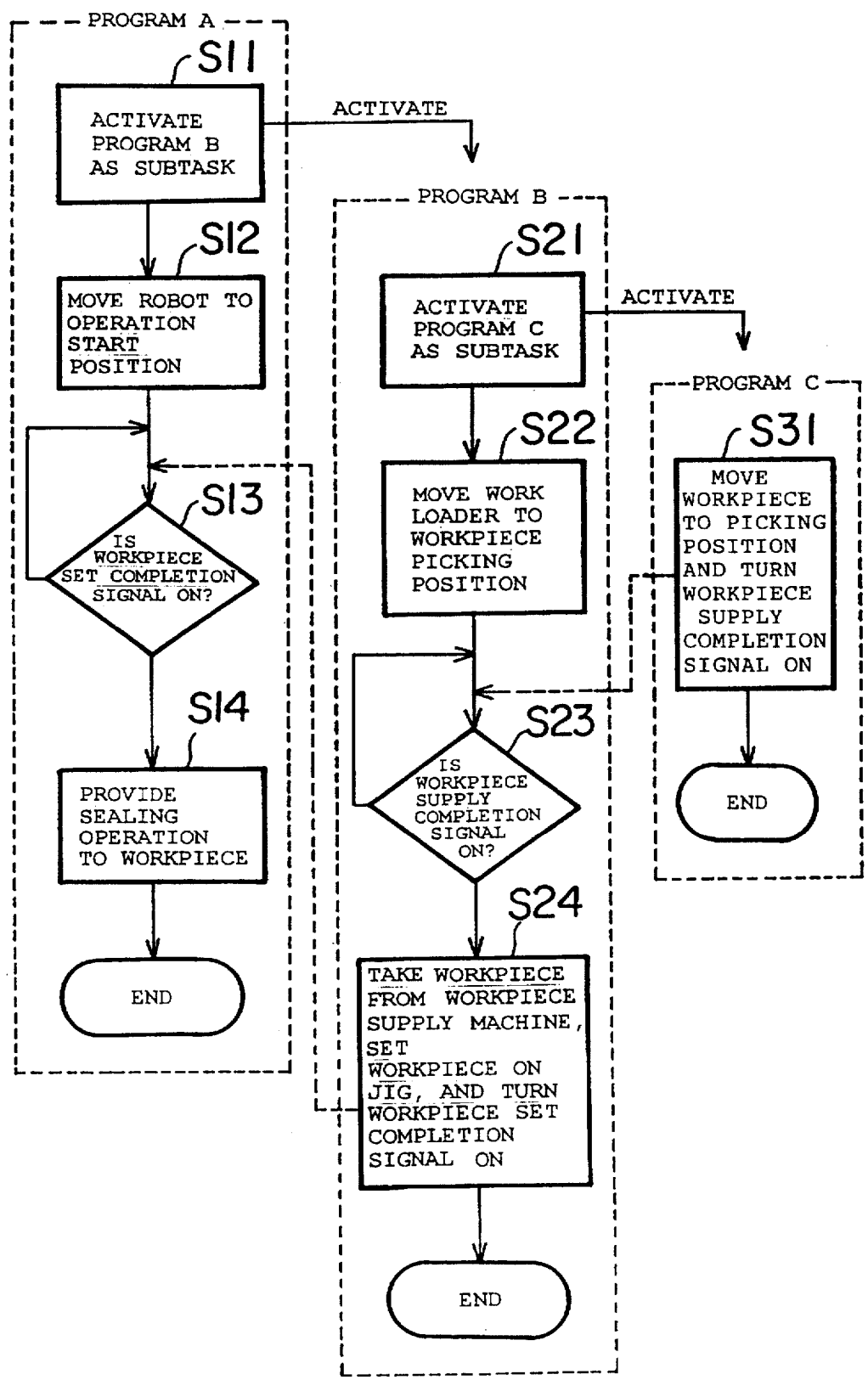
FIG. 3 is a flow chart illustrating one example of a program execution of a robot control unit.

FIG. 3 is a flow chart illustrating one example of a program execution of a robot control unit. Programs to control the robot system exemplified in FIG. 2 are the program A, program B, and program C. In this robot control unit 60, activation of the system is commanded only to the program A.

In the program A, the program B is activated as a subtask in step S11, thereby a set membership relation is automatically held between the program A and the program B. Then, in step S12, the sealing robot 61 is moved to its operation start position. In Step S13, it is determined whether the workpiece 64 is set in position on the jig 66. If the workpiece 64 is set in position, flow advances to step S14 and the sealing robot 61 seals the workpiece 64 using a sealing gun 67.

When activated by the program A, the program B is executed in parallel to execution of the program A. When the program B is activated, first, the program C is activated as a subtask in step S21. Thereby a set membership relation is automatically held in step S21. Then, in step S22, the workpiece loader 62 is controlled and moved to the loading position of the workpiece 64 which is supplied by the workpiece supply machine 63. In step S23, it is determined whether the workpiece 64 reaches to the loading position. If the workpiece 64 reaches to the position, then flow advances to Step S24 and the workpiece loader 62 uses the loading hand 65 to pick up the workpiece 64 from the workpiece supply machine 64 and sets the workpiece 64 in position on the jig 66. At this time, a workpiece set completion signal is turned on in the program B. The workpiece set completion signal is directed before determination in step S13 of the program A.

When activated by the program B, the program C is executed in parallel to execution of the program A and program B. In step S31 of the program C, the work supply machine 63 is controlled to move the workpieces 64 to the position where the workpieces 64 are sequentially loaded by the workpiece loader 62 and when a workpiece reaches to the position, a workpiece supply completion signal is turned on. The workpiece supply completion signal is directed before determination in step S13 of the program B.

FIGS. 4(A), 4(B), and 4(c) are diagrams which comprise a representation of examples of program of a robot control unit. FIGS. 4(A), 4(B), and 4(C) are respective examples of the program A, program B, and program C.

According to the example of the program A, the program B is activated by the command of the first line, and the sealing robot 61 is moved to its operation start position ("P [1]") by the command of the second line. After the sealing robot 61 is moved to the start position, the third line makes the sealing robot 61 wait until the workpiece set completion signal (SDO [1]) is turned on. When the workpiece set completion signal is turned on, a series of sealing operations is performed from the sealing start operation (SS) to the sealing end operation (SE) through the 4th to 20th lines.

According to the example of the program B, the program C is activated by the first line, and the workpiece loader 62 is moved to its workpiece loading position ("P [1]") by the second line. After the workpiece loader 62 is moved to the position, the third line makes the workpiece loader 62 wait until the workpiece supply completion signal (SDO [2]) is turned on. When the workpiece supply completion signal is turned on, a macro program named "PICK WORKPIECE" to pick up a workpiece is accessed and executed by the 4th line. Then the 5th line allows the workpiece loader 62 to take the workpiece 64 to the jig 66, and the 6th line accesses and executes the macro program named "SET WORKPIECE" to set the workpiece 64 on the jig 66. Then the 7th line turns on the workpiece set completion signal (SDO [1]).

According to the example of the program C, in response to the activation command from the program B, the first line accesses and executes a macro program named "MOVE WORKPIECE" to move the workpiece 64 to the loading position of the workpiece loader 62. When the workpiece 64 is moved to the loading position of the workpiece loader 62, the second line turns on the work supply completion signal (SDO [2]).

As mentioned heretofore, in accordance with the present invention, since a set membership is provided for a plurality of programs related mutually, the plurality of the programs are activated only by activating the originating program, thereby activation of the programs is facilitated.

In addition, the load put on the program control in the multitask environment is largely reduced without impairing flexibility of the system, and therefore occurrence of an operational error can be prevented.

Further, on constructing an automated system, it is possible to use equipment and control software which has been prepared for the conventional single task environment without changing.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A program control system in a multitask environment wherein operational programs respective for machine tools or industrial robots are allowed to be executed in parallel in an environment where a plurality of programs can be executed, comprising:

program execution control means for controlling an execution of a plurality of programs;

a first program of said plurality of programs which is activated for execution as an originating task by said program execution control means and includes a subtask execution command indicating an activation of another of said plurality of programs and a wait command indicating a temporary stop of execution of said first program;

subtask execution recognition means for recognizing said subtask execution command in said first program during the execution of the first program;

a second program of said plurality of programs which is activated for parallel execution as a subtask by said program execution control means in response to the recognition of said subtask execution command in said first program by said subtask execution recognition means, and includes an end command indicating a completion of a task in said second program associated with a task in said first program; and resumption control means for recognizing said wait command in said first program during the execution of said first program and for recognizing said end command in said second program during the execution of said second program, said program execution control means for temporarily stopping the execution of said first program in response to the recognition of said wait command in the first program by said resumption control means and for resuming the execution of said first program in response to the recognition of the end command in said second program by said resumption control means.

2. A program control system in a multitask environment according to claim 1, further comprising a third program which is activated for execution by said program execution control means as a subtask of said first program or said second program.

* * * * *